Patented Apr. 12, 1949

2,467,210

UNITED STATES PATENT OFFICE 2,467,210

FLUID SEAL

Fred A. Helfrecht, Redwood City, Calif., assignor to National Motor Bearing Co., Inc., Redwood City, Calif., a corporation of California Application April 9, 1946, Serial No. 660,699

2 Claims. (Cl. 288—2)

1

This invention relates to improvements in fluid seals such as are used for sealing the annular space between a cylindrical bore and a shaft.

One of the objects of this invention is to provide a seal of maximum simplicity and one which lends itself to fabrication by a molding process.

Another object of the invention is to provide a fluid seal in which the body member assists the sealing member in accomplishing its sealing function as well as in providing a resilient support for the sealing member.

Another object of the present invention is to provide a fluid sealing member which may be made for a given shaft diameter and which may readily be incorporated into a case of various outside diameters so as to fit in the bore of any number of housings.

The above and other objects and features of the invention will become apparent from the specification and from the drawings in which Fig. 1 is a view in perspective of a portion of a seal and of a shaft with the seal cut to show a cross section of its shape and with the shaft spaced away from the sealing lip to show the relative preferred sizes of the parts;

Figure 1:
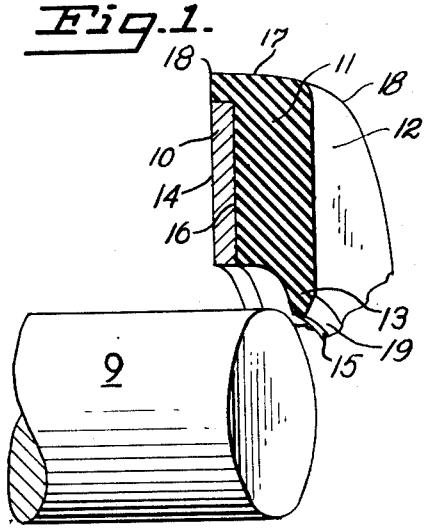

The drawings are used pursuant to the statute to show one form of the invention and it is not the intention to limit the invention except as required by the prior art and the claims appended hereto.

In the drawings the numeral 8 represents a housing or bore in a piece of machinery through which projects the shaft 9. The latter may be a rotating shaft or it may be a reciprocating shaft. The housing or bore 8 is usually a flange formed on the casing in which is retained a lubricant or, in the case of a water pump, water in the circulating system. In the case of a seal used in a transmission, the bore 8 would be a part of the transmission housing.

The invention concerns the unitary sealing member which is adapted to seal the annular space between the cylindrical bore 8 and the cylindrical shaft 9, and includes the combination of the radially extending rigid member 10 adjacent one radial face of the sealing device. This

2 member 10 may be of metal, plastic, or such other suitable material as the manufacturer may deem best suited to the purpose. Its inner diameter adjacent the shaft side is preferably the same as the mould in which it is placed when it is bonded to the other portion of the sealing member. Likewise its outer diameter near the housing bore 8 is preferably of smaller size than the inside diameter of the bore 8, so that there is a small amount of rubber or composition material adjacent its outer periphery to act as a sealing member or as a gasket.

The rigid member 10 is bonded on one radial face to a flexible body member 11 which body member 11 is preferably of substantial axial thickness in cross section. Its axial or longitudinal dimension may vary depending upon the degree of movement or flexing desired for its unrestrained resilient opposite wall portion 12 which serves as the resilient cushion mounting and backing-up means for the short annular rib or sealing flange portion 13. While the rigid member 10 is shown as constituting one face of the seal it may be embedded in the body member 11 but near its edge so that its face 14 is buried somewhat in the material of the body member. Even in this instance, however, the body member 11 should still have a substantial axial thickness between the rigid member 10 and the place where the annular rib portion 13 is depending from it. The purpose of all this is to have the unrestrained radial face 12 free to flex, stretch or compress, as needed, in any direction.

Figure 2:
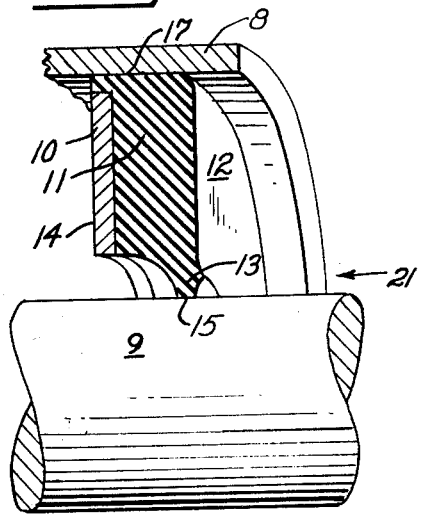
Fig. 2 is a similar perspective view with the seal in a housing bore and bearing on the shaft.

The short flexible sealing lip annular rib portion 13 extends generally radially from the free portion of the flexible member 11 adjacent the edge 12 into contact at 15 with the cylindrical surface 9 being sealed. The rib portion 13 is of less axial thickness than the body member 11 and has the major portion of its engagement of its face 15 on the shaft 9 within the axial limit of the resilient supporting member 11. This is shown in Fig. 2, where the sealing lip portion 15 falls to the left of the face 12 of the sealing member. This "in-line" arrangement assures a good backing-up of the sealing face 15 by its annular rib portion 13 and the resilient floating body portion 11 of the body member.

This body member 11 is shown generally rectangular in cross section, with one wall 12 on the free side, and the wall 16 on the other side secured to the rigid member 10. As stated before, the material lying between the wall 16 and the wall 12 should be of greater thickness than the annular rib portion member 13 and should be of a consistency to give a resiliency or a resilient base by which the rib member 13 is suspended. Stated in another way, the device shown in Figs. 1 and 2 comprises a sealing member having a unitary structure 11 with the rigid face 10 and with the opposite face 12 free to flex radially and in any other direction with the body 11 of flexible material, and with the resilient sealing lip rib portion 13 secured, or moulded in the first instance, adjacent the flexible face 12 of the sealing member.

Figure 3:
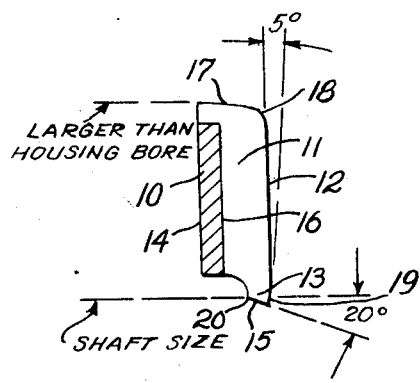
Fig. 3 is a cross section of a preferred form of the seal showing the preferred angular cut and sizes for the parts.

In Fig. 3 is shown preferred dimensions of one of these sealing members. The outer peripheral face 17 of the sealing member is tapered slightly, and the corner at 18 is preferably of a larger outside diameter than is the inside diameter of the housing bore 8. When inserted in the form shown in Fig. 2 this assures a leak-tight fit between the periphery 17 and the inside wall of the housing bore. The sealing lip rib portion 13 is formed by a cut at an angle of about five degrees which forms on it the face 19. The shaft contacting portion 15 of the sealing element 13 is cut or formed during moulding at about a 20-degree angle to the axis of the shaft. Also it is preferred that the diameter of the larger edge 20 of the sealing face 15 should be shaft size or slightly smaller than shaft size. It has been found in practice that better results are obtained if the whole of the sealing face 15 is in contact with the shaft 9 as distinguished from a structure in which the diameter of the edge 20 is larger than the shaft diameter, so that a portion of the sealing face 15 does not bear on the shaft.

Figure 4:
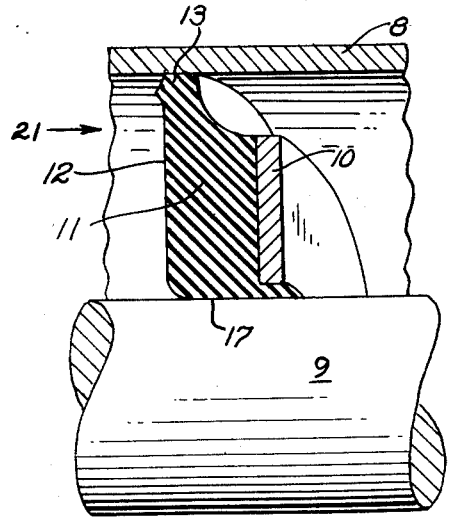
Fig. 4 is a view similar to Fig. 2 in which the seal is used as a radial seal and rotates with the shaft on which it is rigidly secured.

The form of device shown in Fig. 4 is identical with the structure shown in Fig. 2 except for the reversal of the parts. In Fig. 4 the periphery 17, which is in non-rotative, fluid-tight fit with the cylindrical surface it is sealing, is on the inside instead of on the outside as in Fig. 2, and is in contact with the shaft 9. The sealing lip 13, which is flexibly mounted by means of the offset resilient cushion body member 11, is in sliding sealing contact with the inside of the bore 8. The rigid member 10 is bonded or secured to the face 16 of the body member 11, so that the opposite face 12 is free to flex and move in any direction under the influence of the sealing member 13 which is in contact with the bore 8.

The angles and dimensions shown in Fig. 3 are not absolutely critical, but they are the ones which have been found on the devices so far constructed to perform very satisfactorily.

An important feature of the invention is that the rib portion 13 is supported by a band of rubber or other resilient material 11 which acts as a cushion and also exerts a pressure towards the shaft directly in line with the sealing lip 15 at all times.

While I have shown the body member 11 and the rib portion 13 as made in one piece, it is obvious that the body member 11 might be bonded to the rigid member 10 in one operation and then the rib portion 13 could be installed later or could become a part of the face 12 of the body member 11. An important thing is that one face 16 is rigid and that the other face 12 is free to flex, to weave and move under the influence of the sealing lip 13 as it bears on the shaft which due to eccentricities or lack of proper support may shift or weave during rotation.

The mass of rubber or resilient material 11 in back of the radial rib portion 13 appears to be an important factor in the successful operation of the device because the in-line arrangement tends to compress the sealing face 15 on the shaft with just the right amount of pressure to accomplish the sealing function and to prevent the fluid being sealed from passing along the shaft. In the device shown in Fig. 2 the direction of the movement of the fluid, if it were not stopped by the sealing member, would be to the left in the direction of the arrow 21. In the device shown in Fig. 4 the fluid being sealed would come from the opposite direction, that is, from the left toward the right.

Another advantage of the construction shown is that greater freedom from close tolerances is possible in the peripheral face 17 of the seal itself which has the non-rotative fit as well as in the bore or shaft with which the face 17 contacts. In other words, the manufacturer can have greater dimensional variations and still have an effective sealing by the device shown.

It will be obvious from the foregoing description that changes may be made in details in building seals to accomplish the advantages described herein, and still come within the claims and the teachings of this patent.

What I claim is:

1. A fluid seal including a substantially continuous annular rigid member; and a continuous annular body of resilient material non-rotatably secured to said member; said body of resilient material comprising an annular base portion of substantial mass and axial thickness having one radial face adhesively secured to a radial face of said member over a substantial portion of said faces, and having its other radial face unrestrained and free to flex, and a single annular rib portion extending radially in a plane substantially in-line with the unrestrained portion of said base portion and forming a short radially directed sealing lip, which lies substantially in said plane and close to said base portion, whereby said sealing lip is backed up directly by and receives the major portion of its sealing pressure from its in-line annular rib portion and from the resilient unrestrained portion of said annular base.

2. A fluid seal including a substantially continuous annular rigid member; and a continuous annular body of resilient material non-rotatably secured to said member; said body of resilient material comprising an annular base portion of substantial mass and axial thickness having one radial face adhesively secured to a radial face of said member over a substantial portion of said faces, and having its other radial face unrestrained and free to flex, and a single annular rib portion of less axial thickness than said resilient annular base portion extending radially in a plane substantially in-line with the unrestrained portion of said base portion and forming a short radially directed sealing lip, which lies substantially in said plane and close to said base portion, whereby said sealing lip is backed up directly by and receives the major portion of its sealing pressure from its in-line annular rib portion and from the resilient unrestrained portion of said annular base.

FRED A. HELFRECHT.

REFERENCES CITED

The following references are of record in the file of this patent:

UNITED STATES PATENTS

| Number | Name | Date |
|---|---|---|
| 2,064,527 | Ericcson | Dec. 15, 1936 |

(Other references on following page)

UNITED STATES PATENTS

| Number | Name | Date |
|---|---|---|
| 2,233,902 | Schmied | Mar. 4, 1941 |
| 2,335,561 | Dodge | Nov. 30, 1943 |
| 2,348,587 | Antonelli | May 9, 1944 |
| 2,350,697 | Petch | June 6, 1944 |
| 2,405,279 | Victor | Aug. 6, 1946 |
| 2,434,686 | Clayton-Wright | Jan. 20, 1948 |
| 2,437,900 | Winklejohn | Mar. 16, 1948 |

FOREIGN PATENTS

| Number | Country | Date |
|---|---|---|
| 479,743 | Great Britain | 1938 |
| 544,732 | Great Britain | 1942 |
| 544,881 | Great Britain | 1942 |
| 799,867 | France | 1936 |
| 377,926 | Italy | 1940 |